United States Patent [19]

Raynes

[11] 4,084,884

[45] Apr. 18, 1978

[54] LIQUID CRYSTAL DEVICES

[75] Inventor: Edward Peter Raynes, Worcester, England

[73] Assignee: The Secretary of State for Defence in Her Britannic Majesty's Government of the United Kingdom of Great Britain and Northern Ireland, London, England

[21] Appl. No.: 768,371

[22] Filed: Feb. 14, 1977

Related U.S. Application Data

[63] Continuation-in-part of Ser. No. 551,551, Feb. 21, 1975, abandoned, and a continuation-in-part of Ser. No. 552,346, Feb. 24, 1975, abandoned.

[30] Foreign Application Priority Data

Feb. 21, 1974 United Kingdom .................. 8042/74
Mar. 1, 1974 United Kingdom .................. 9489/74

[51] Int. Cl.² ............................................. G02F 1/13
[52] U.S. Cl. ................................................... 350/334
[58] Field of Search ................................. 350/160 LC

[56] References Cited

PUBLICATIONS

Sussman A, "Electro-optic Liquid Crystal Devices; Principles and Applications", IEEE Trans., vol. PHP-8, No. 4, Dec. 1972, pp. 24–37.
Guyon, E. et al., "On Different Boundry Conditions of Nematic Films on Obliquely Evaporated Plates", Lett. in App. Eng. Sciences, vol. 1, pp. 19–24, 1973.
Gray G. W., Harrison K. J., Nash J. A., "New Family of Nematic Liquid Crystals for Display", Elec. Lett., vol. 9, No. 6, Mar. 22, 1973, pp. 130–131.

*Primary Examiner*—John K. Corbin
*Assistant Examiner*—Rolf Hille
*Attorney, Agent, or Firm*—Stevens, Davis, Miller & Mosher

[57] ABSTRACT

It has been found that twisted nematic liquid display devices can have a patchy appearance as a result of two problems concerned with degeneracy of the orientation of the molecules in the "on" and "off" states respectively. In the present invention these two problems are solved together by using as the liquid crystal material a naturally optically active material having a molecular helical pitch not less than twice the spacing between the substrates of the device cell, and (1) by treating and later arranging the surfaces of the substrates so that the molecules in the cell liquid crystal layer all lie generally obliquely to the plane of the substrates in the "off" state, or (2) by treating and later arranging the surfaces of the substrates so that the liquid crystal molecules adjacent to one substrate lie in the plane of the substrate but the molecules adjacent to the other substrate lie oblique to that substrate whereby the molecules in the interior of the layer lie slightly oblique to both substrates.

In accordance with (1), the substrates may be rubbed in the conventional way and two unit vectors defined by the rubbing directions may be specially selected having regard to the natural molecular helix of the liquid crystal molecules to give the desired molecular arrangement in the cell.

In the embodiment (2), both substrates may be deposited with a dielectric coating evaporated with an angle of incidence $\theta$ in the range $15° \leq \theta \leq 45°$ and one of the substrates may be rubbed before arranging the respective projections of the evaporation direction on the substrates to be perpendicular to one another.

20 Claims, 12 Drawing Figures

LIQUID CRYSTAL DEVICES

This application is a continuation-in-part of my application Ser. No. 551,551 filed on Feb. 21, 1975 and my application Ser. No. 552,346 filed Feb. 24, 1975, both now abandoned.

The present invention relates to liquid crystal devices.

Of the known liquid crystal devices which use electro-optic effects and which consequently have display applications, twisted nematic devices have probably received most attention recently. These devices are normally produced by constructing a twisted nematic cell and locating it between optical polarizers. The cell is conventionally prepared by softly rubbing in a single direction the surfaces of two glass plates on which transparent conducting electrodes have previously been deposited, arranging the surfaces to face one another with their rubbing directions mutually perpendicular and then introducing a layer of nematic liquid crystal material between the two surfaces. The molecules in the layer have an elongated shape: those immediately adjacent to the surfaces align with their axes following the rubbing directions on those surfaces; those in the interior of the layer lie with their axes along intermediate directions in an arrangement which constitutes roughly a 90° progressive twist in the direction of the molecular axes throughout the layer, i.e., a quarter of a turn of a helix. In operation, the intensity of light passing through the twisted nematic device is modulated by applying an electric field between the layers of transparent conducting electrodes on the two inner surfaces to cause re-alignment of the liquid crystal molecules.

It has now been found that the liquid crystal molecules immediately adjacent to the rubbed surfaces do not lie exactly in the plane of those surfaces, but generally at an average angle of about 2° to the rubbing directions on them.

As an alternative to aligning the liquid crystal molecules by the rubbing technique described above, the liquid crystal molecules may alternatively be aligned by the known technique of "oblique evaporation". A molecular arrangement similar to that obtained by rubbing can be obtained in known cells in which the surfaces are treated not by rubbing but by the alternative technique known as "oblique evaporation". Molecules of a transparent dielectric material are deposited with a grazing incidence angle of between 0° and 15° onto the surfaces of the glass plates to form a thin coating on them; the coatings then provide alignment of the liquid crystal molecules. However, when alignment following oblique evaporation is used the liquid crystal molecules immediately adjacent to the coated surfaces lie not at an angle of about 2° but generally at an angle of about 30° to the coated surfaces.

Molecules of a transparent dielectric material are deposited onto the appropriate surfaces of the transparent substrates in a direction, hereinafter referred to as the "oblique evaporation direction", which is at an angle, hereinafter referred to as the "angle of incidence", to those surfaces to form a coating on them. These coatings are additional to the transparent conducting electrodes which are already on those surfaces. The liquid crystal molecules are aligned by the coatings.

It is known that, if the oblique evaporation technique is used with an angle of incidence less than a critical value, which is about 15°, the liquid crystal molecules form an arrangement similar to that obtained by the rubbing technique, i.e., with the axes of the liquid crystal molecules immediately adjacent to the glass surfaces generally at an angle to those surfaces; however, in this case the average angle is not 2° but about 30°.

It is also known that, if the oblique evaporation technique is used with an angle of incidence greater than the critical value mentioned above, i.e., greater than about 15°, but less than another critical value, which is about 45°, then the liquid crystal molecules form a different arrangement in which the average direction along which their axes lie is in the plane of the glass surfaces throughout the entire liquid crystal layer.

As pointed out in my application Ser. No. 551,551 filed on Feb. 21, 1975, it has recently been discovered that two problems exist with twisted nematic cells produced in the known ways described above. The result of both problems is that when the device incorporating such a cell is viewed it appears imperfect, i.e., patchy, and this is very undesirable particularly in display applications.

As disclosed in my application Ser. No. 552,346 filed Feb. 24, 1975, the two problems can exist with liquid crystal cells of the kind described if the liquid crystal material is nematic and if the inner surfaces of the optically transparent substrates are both treated in one of the ways described above, i.e., by rubbing, by oblique evaporation with an angle of incidence less than about 15° or by oblique evaporation with an angle of incidence in the range from about 15° to about 45°. The result of both problems is that when a device incorporating such a cell is viewed at an angle by an observer it appears imperfect, i.e., patchy, and this is very undesirable particularly in display applications.

The first problem, which will hereinafter be referred to as that of "reverse twist", arises as follows. Ideally the arrangement of molecules in a twisted nematic cell should have a single sense of twist so that the plane of polarization of light which passes through the cell is rotated in a single sense. However, when the liquid crystal material is a naturally nematic material its molecules have an arrangement which in some regions twists in one sense and which in other regions twists in the opposite sense in the absence of an electric field. This arragement is permanent since a twist in one sense has an identical energy to a twist in the opposite sense.

The second problem, which will hereinafter be referred to as that of "reverse tip", arises as follows. When an electric field is applied between the transparent conducting regions (i.e., the device electrodes) on the respective inner surfaces of the transparent plates or substrates of a twisted nematic cell, the liquid crystal molecules are re-oriented in the electric field, the extent of the re-orientation increasing towards the interior of the liquid crystal layer. The interior molecules can lie initially in the plane of the two inner surfaces; as a result it is equally energetically favorable for these molecules to be re-oriented either towards the positive end of the electric field (clockwise), which some molecules do, or towards the negative end of the electric field (counter clockwise), which other molecules do.

For the purpose of generality, a liquid crystal cell will hereinafter be referred to often as a cell "of the kind described" if it includes two substrates arranged to face one another, each of the substrates having deposited on its inner surface a layer of electrode material, at least one of the substrates and its layer of electrode material being optically transparent and, between the said inner surfaces a layer of a liquid crystal material whose molecules are arranged so that the average local direction along which their axes lie twists progressively from one of the said inner surfaces to the other.

"Optically transparent" is intended to refer to transparency to radiation in the infra-red and ultra violet parts of the electromagnetic spectrum as well as the visible part.

According to the present invention as described in application Ser. No. 551,551, a liquid crystal device includes a cell of the kind described hereinbefore, wherein the liquid crystal material is a naturally optically active material having a natural molecular helical pitch of the order of or greater than twice the separation between the said inner surfaces and wherein the mutual arrangement of the said inner surfaces is such that the average orientation of the liquid crystal molecules of the said layer is generally oblique to the said inner surfaces throughout the entire layer in the absence of an applied electric field.

According to the present invention as described in application Ser. No. 552,346, a liquid crystal cell of the kind described hereinbefore includes as its liquid crystal material a naturally optically active material having a natural molecular helical pitch at least twice the separation between the inner surfaces of the two substrates of the cell, wherein the average direction of the axes of the molecules of the liquid crystal material immediately adjacent to one of the said inner surfaces is at an angle to that one inner surface and wherein the average direction of the axes of the molecules of the liquid crystal material immediately adjacent to the other inner surface is generally parallel to that other inner surface.

"Naturally optically active material" is intended to distinguish a material which is optically active whether or not it is in the cell from one which is only optically active when in the cell, e.g., pure nematic material.

If the cell is produced using the technique of rubbing described above applied to both plates then in order for the liquid crystal molecules to have an orientation, i.e., to lie, generally oblique to the said inner surfaces throughout the entire liquid crystal layer, the directions of rubbing on the inner surfaces must be mutually arranged so that they define about the axis perpendicular to the inner surfaces a screw sense which is in opposition to the sense according to the convention defined hereinafter of the natural helical arrangement of the liquid crystal molecules. Likewise, if the cell is produced using the technique of oblique evaporation applied to both plates then in order for the liquid crystal molecules to lie generally oblique to the said inner surfaces throughout the entire layer the respctive projections on the inner surfaces of the directions used for evaporation must be mutually arranged so that they define about the axis perpendicular to the inner surfaces a screw sense which is in opposition to the sense according to the convention defined hereinafter of the natural helical arrangement of the liquid crystal molecules. By a "screw sense" is meant the sense, which is either right-handed or left-handed, in which the thread of an equivalent screw would run from the end of a unit vector along the appropriate direction, i.e., rubbing direction or evaporation projection direction, on one inner surface to the end of a unit vector along the appropriate direction on the other inner surface via the shorter route between those ends.

The naturally optically active liquid crystal material may be one of the following:

(1) a material which is naturally a cholesterogenic or cholesteric liquid crystal material (one which exhibits a cholesteric liquid crystal phase) and whose helical molecular arrangement has the appropriate pitch;

(2) a material which consists of a mixture of a nematogenic or nematic material (one which exhibits a nematic liquid crystal phase) and a cholesterogenic material, the mixture being in such proportions that the helical molecular arrangement has the appropriate pitch;

(3) a material which consists of a mixture of a nematogenic or nematic material and a non-liquid crystal optically active material, the mixture being in such proportions that the helical molecular arrangement has the appropriate pitch.

In the device according to the invention described in application Ser. No. 551,551 the problem of reverse twist is avoided by using the said optically active liquid crystal material, whereby the liquid crystal molecules have an intrinsic tendency to arrange themselves in a twist in one sense only, and the problem of reverse tip is avoided by treating and mutually arranging the inner surfaces of the plates in such a way that the liquid crystal molecules lie oblique to the inner surfaces throughout the entire liquid crystal layer, whereby the molecules in the interior of the layer are re-oriented all in the same way when an electric field is applied.

In accordance with the disclosure in application Ser. No. 552,346, preferably, the said cell is produced by treating both inner surfaces by the technique of oblique evaporation using an angle of incidence in the range of from about 15° to about 45° and then by treating the said one inner surface by the rubbing technique described above prior to introduction between the inner surfaces of the optically active liquid crystal material. In this case, the rubbing direction is arranged to be perpendicular to the projection on the said one inner surface of the oblique evaporation direction. Alternatively, the said one inner surface may be treated by the rubbing technique alone or by the oblique evaporation technique alone using an angle of incidence less than about 15°.

There is an apparent ambiguity in this art as to whether a given sense of twist of a natural helical molecular arrangement is a right-handed sense or a left-handed sense. However, it is known that the liquid crystal molecules in a dilute solution of a derivative of the compound cholesterol in a nematic material are always arranged in one helical sense only. The convention will be used in this specification that this one sense will be considered a right-handed sense; consequently, helical molecular arrangements whose sense is opposite to this one sense will be considered as having a left-handed sense.

Embodiments of the present invention as described in Ser. No. 551,551 will now be described by way of example with reference to the accompanying drawings, in which.

A liquid crystal cell of the kind described hereinbefore and which embodies the invention is made by the following method. The surfaces of two glass slides (thin glass plates) are carefully cleaned. A thin film of transparent conducting electrode material such as tin oxide is formed by a known technique on a surface or selected parts of a surface of each slide to form the device electrodes; if the formation of the film is in selected parts of each surface it may for instance be carried out by initially depositing a single continuous film and then selectively photo-etching the film. The surfaces carrying the transparent conducting films are then rubbed with a suitable piece of soft fabric such as cotton wool. A separate single rubbing direction is used for each of the two surfaces; that is to say each of the slides is rubbed in a single direction in a series of forward strokes but that the fabric is lifted from each surface for the return strokes between the forward strokes. The two surfaces are then brought close together so that they face each other and so that their rubbing directions are perpendicular to one another.

Figure 1:
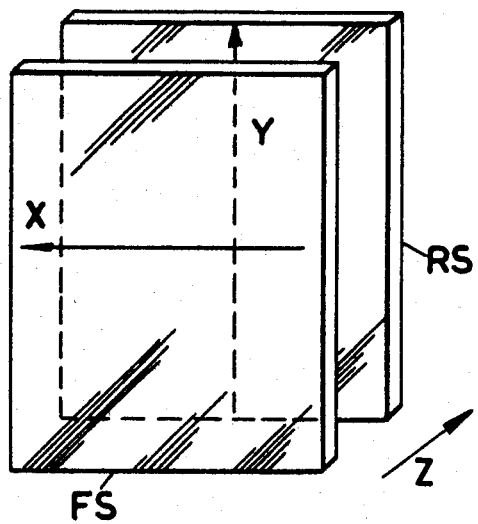
FIG. 1 is a perspective view of two glass slides, illustrating a way of arranging the slides used in the formation of a liquid crystal device embodying the invention.

FIG. 1 is a perspective view of the slides indicating the correct arrangement thereof. The front slide is indicated in FIG. 1 by the reference symbol FS and the rear slide is indicated in FIG. 1 by the reference symbol RS. The inner surface of the front slide has a rubbing direction X and the inner surface of the rear slide has a rubbing direction Y. The directions X and Y are mutually arranged so that together they form a right-handed screw sense as defined above about a perpendicular axis Z running from the front slide FS to the rear slide RS.

The effect of rubbing the surface of a glass slide in one direction is apparently to distort the surface profile of the slide so that if liquid crystal molecules are subsequently deposited on that surface of the slide they point generally in a single direction at a small angle to the slide, which single direction has as a projection on the slide the direction of rubbing. It has been discovered in connection with the present invention that when the two slides FS and RS are arranged in the manner illustrated in FIG. 1 with their rubbed surfaces facing one another the profiles on these two surfaces are such as to give alignment in the normal way to liquid crystal molecules without introducing the problem of "reverse tip" mentioned above, (when a voltage is later applied) provided that the twist of the liquid crystal molecular arrangement is in a sense which opposes the right-handed screw sense defined by the mutual arrangement of the directions X and Y about the axis Z, i.e. the molecular arrangement is in a left-handed screw sense (according to the convention defined above).

As noted above, if the liquid crystal material is nematic the problem of reverse twist mentioned above may arise, and this causes part of the liquid crystal molecular arrangement to have a right-handed sense of twist and part to have a left-handed sense of twist. However if the liquid crystal material is a naturally optically active one having a left-handed molecular twist having the appropriate pitch (as discussed below) the problem of reverse twist is avoided.

Therefore the gap between the two slides FS and RS is filled with a suitable optically active liquid crystal material having a natural left-handed helical molecular arrangement of the appropriate pitch. Suitable material is described below. The slides may for instance be held apart by a spacer, and the liquid crystal material may be drawn into the gap between them by capillary action. The liquid crystal molecules then arrange themselves in the normal way between the slides to point in, i.e. so that their axes lie along, a direction which twists continously in one sense only throughout roughly 90° from the region adjacent the rubbed surface of one slide to the region adjacent the rubbed surface of the other slide.

If the screw sense defined by the directions of rubbing does not oppose the helical screw sense of the natural molecular arrangement of the liquid crystal material used then the problem of reverse tip mentioned above arises when a voltage is later applied. In other words, reverse tip arises if the direction of rubbing on the front slide FS is in the direction opposite to the direction X whilst that on the rear slide RS is in the direction Y for a liquid crystal material having a left-handed helical molecular arrangement (according to the convention defined above). However, if the direction of rubbing on the front slide FS is in the direction opposite to the direction X and the direction of rubbing on the rear slide RS is in the direction Y then the problem of reverse tip does not arise if the liquid crystal material is optically active with a right-handed helical molecular arrangement (according to the convention defined above).

Figure 2A:
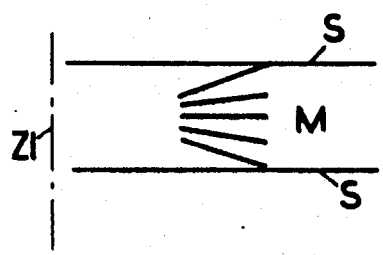
FIG. 2a and FIG. 2b are diagrammatical cross-sectional illustrations of the arrangement of molecules in a conventional liquid crystal cell.
Figure 2B:
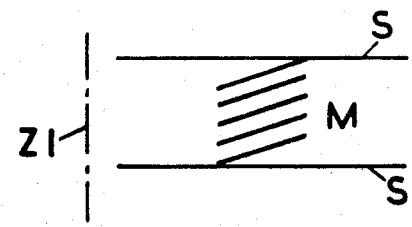

The apparent explanation of this phenomenon is as follows. Consider a simple nematic liquid crystal cell in which the directions of rubbing on each of the slides of the cell are arranged initially to be parallel. The liquid crystal molecules immediately adjacent to the respective slides of the cell are aligned generally oblique to the inner surfaces of those slides. Consequently the liquid crystal molecules will be in one of two possible arrangements according to whether the two rubbing directions are both in the same sense or are in opposite senses. FIG. 2a illustrates one of these arrangements and FIG. 2b illustrates the other. In the arrangement in FIG. 2a the molecules, indicated by a symbol M, between the slides, indicated by a symbol S, form a "splayed" regime and all point towards the interior of the liquid crystal layer. The molecules M in the interior are in the plane of the slides S. In the arrangement in FIG. 2b the molecules M form a "tilted regime" and are all tilted in one sense with respect to the slides S. Consider now that one of the slides S is kept in the same plane but is rotated through 90° about the axis, indicated by a symbol Z1, perpendicular to that plane; this means that the liquid crystal molecules immediately adjacent to the rotated slide S rotate with that slide.

After rotation of one of the slides S in the arrangement illustrated in FIG. 2a the molecules M in the interior of the layer will still be in the plane of the slides S, and after rotation of one of the slides S in the arrangement illustrated in FIG. 2b the molecules M throughout the entire layer will still be tilted with respect to the slides S.

The 90° rotated versions of the arrangements illustrated in FIGS. 2a and 2b are respectively equivalent to two different forms of twisted nematic cell. In other words, in twisted nematic cells produced in the conventional way the molecules are either arranged in a "splayed" form which is the same as the arrangement obtained by rotation of one of the slides S illustrated in FIG. 2a or are arranged alternatively in a "tilted" form which is the same as the arrangement obtained by rotation of one of the slides S illustrated in FIG. 2b.

Consider now introducing between the slides S an optically active liquid crystal material to replace the nematic material. The molecules in the optically active liquid crystal material will be in a multiplicity of helical twisted arrangements, each with the same pitch and sense of twist, even before introduction between the slides S; consequently the molecules in a given arrangement (before introduction) considered between two parallel reference planes will be tilted and twisted with respect to the planes. The twist of the molecules (for nematic or optically active liquid crystal material) caused by the 90° rotation of one of the slides S must be considered in conjunction with the natural helical twist of the optically active liquid crystal material when the latter is introduced between the slides S which become its reference planes.

If the top slide S is rotated clockwise in FIG. 2a the twist produced by the rotation matches the natural twist of a left-handed twisting optically active liquid crystal material and the arrangement of the molecules M produced by the combination of the two twists still leaves the molecules M in the interior of the layer in the plane of the slides.

If the top slide S is rotated anticlockwise in FIG. 2a the twist produced by the rotation is different from the natural twist of a left-handed material. The resultant twist produced by the combination of the two leaves the molecules M in the interior of the layer oblique to the slides S throughout the layer similar to a 90° rotated version of FIG. 2b with nematic material.

If the top slide S is rotated clockwise in FIG. 2b the twist produced by the rotation matches the natural twist of a left-handed material. The resultant twist produced by the combination of the two twists leaves the molecules M in the interior of the layer oblique to the slide S throughout the layer.

If the top slide S is rotated anti-clockwise in FIG. 2b the twist produced by the rotation is different from the natural twist of a left-handed material. The resultant twist produced by the combination of the two twists leaves the molecules M in the interior of the layer in the plane of the slides S in a way similar to the 90° rotated version of FIG. 2a with nematic material.

If the material has a right-handed natural helical twist the four results mentioned above will each be reversed, i.e. the molecules M in the interior of the resultant layer will be oblique to the slides S for the two cases above where they are in the plane of the slides S and they will be in the plane of the slides S for the two cases above where they are oblique to the slides S. All of these conditions may be summarised by saying that to produce in the final layer an arrangement in which the molecules M in the interior of the layer are oblique to the slides S throughout the layer the screw sense defined by the slides S must oppose the natural helical molecular sense of the optically active liquid crystal material.

In another embodiment of the invention alignment of the liquid crystal molecules may alternatively be achieved by depositing a coating of molecules, such as magnesium fluoride or silicon monoxide, on each of the slides by the conventional process of oblique evaporation at a grazing incidence angle of less than about 15°. The coating so formed has a structure such that liquid crystal molecules align therewith pointing generally in a single direction oblique to the plane of the slide having that coating. Two slides containing two such obliquely deposited coatings are mutually arranged in the same manner as described with reference to FIG. 1 and suitable liquid crystal material can then be introduced between them. In this case the directions X and Y shown in FIG. 1 represent not the rubbing directions but the projections of the respective directions in which the evaporated molecules are deposited; otherwise the mutual arrangement of the slides is the same as described with reference to FIG. 1.

In another embodiment of the invention one of the slides may be coated by oblique evaporation at a grazing incidence angle of 15° or less than the other slide may be rubbed. In this case the direction X (FIG. 1) represents the rubbing direction of the appropriate inner slide surface and the direction Y represents the projection of the direction of the evaporated molecules; otherwise the directions X and Y are mutually arranged in the way described with reference to FIG. 1.

Typically the spacing between the two glass slides in a liquid crystal cell is about 15 μm. In the cells produced by the above methods roughly a 90° helical twist in the molecular arrangement of the molecules of the liquid crystal material is arranged (as usual) in the spacing between the slides. The molecules of the liquid crystal material used need to have a natural helical pitch (a 360° turn of the helix) of about twice the spacing between the slides, i.e. 30 μm or more, but preferably about 80 μm so that the molecules will rearrange themselves to form the $\pi/2$ (90°) twist when located between the slides. If the pitch is significantly less than twice the spacing the molecules will rearrange themselves to form a twist through an angle $m\pi/2$, where $m$ is an odd integer greater than 1, and so such small pitches are unsuitable.

Suitable liquid crystal material having a natural helical molecular pitch of the correct size may for example be made by diluting a nematogenic liquid crystal material with an optically active material which may or may not be cholesterogenic material. The nematogenic material should have a positive dielectric anistropy (i.e. difference between the dielectric constant measured parallel to the molecules and the dielectric constant measured perpendicular to the molecules). A suitable nematic material is the biphenyl

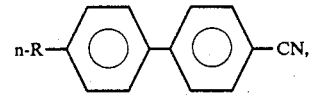

where R is an alkyl or alkoxy group, for example a n-$C_5H_{11}O$. The optically active material will normally not constitute more than 2% by weight of the mixture with the nematogenic material. A suitable cholesteric material for diluting the nematic material to give the appropriate mixture is, for example, cholesteryl nonanoate (0.2% by weight in the mixture with the nematic material).

A suitable mixture may be formed by adding appropriate volumes of nematic and cholesteric materials in a small beaker, heating the beaker above the temperature at which the isotropic liquid phase occurs, i.e. when a clear liquid is produced, stirring, and then allowing the beaker and its contents to cool again.

If the mixture is formed from a nematic liquid crystal material and a non-cholesteric optically active material it may be produced by adding suitable volumes of the nematic material and the non-cholesteric material in a small beaker, heating the beaker above the temperature at which the isotropic phase of the nematic occurs and allowing the beaker and its contents to cool again. The screw sense of the helical arrangement so produced will depend on the particular optically active material used. However if the optically active material is Canada balsam the screw sense of the helical molecular arrangement of the mixture is right-handed. The optically active compound

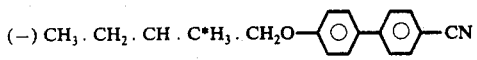

(1% by weight of the mixture with the nematic material) may be alternatively used; it has a left-handed helical molecular arrangement (according to the convention defined above). The asterisk * denotes its optically active centre.

Figure 3:
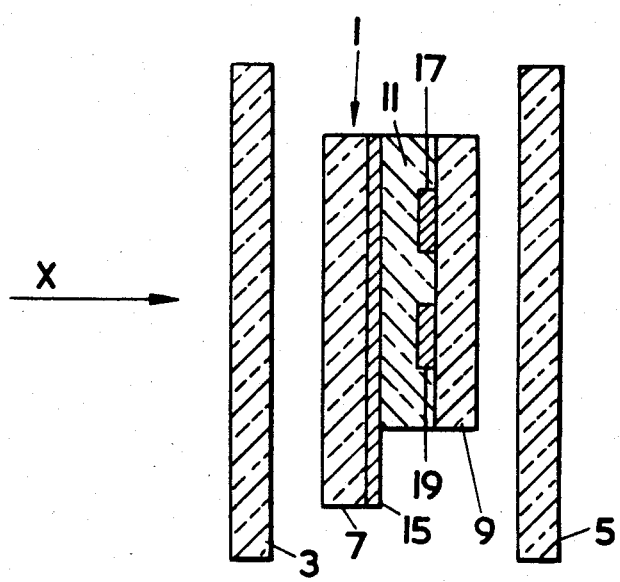
FIG. 3 is a cross-sectional side elevation of a liquid crystal device embodying the present invention.
Figure 4:
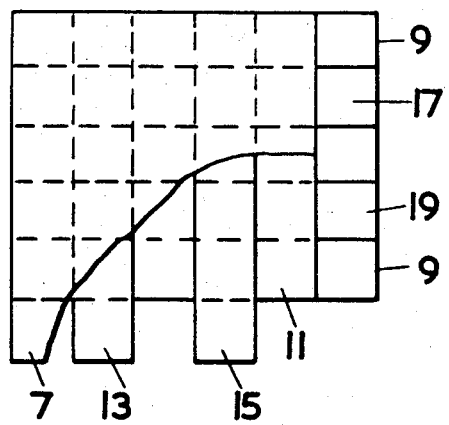
FIG. 4 is a partly cut-away front elevation of part of the device illustrated in FIG. 3.

FIG. 3 is a cross-sectional side elevation of a simple liquid crystal device which includes a cell 1 located between an optical polariser 3 and an optical polarisation analyser 5. FIG. 4 is a partly cut-away front elevation of the cell 1 alone viewed in the direction X. The cell 11 is made by one of the methods embodying the invention described above and includes a glass slide 7 and a glass slide 9 between which is located a layer 11 of liquid crystal material. The slide 7 has deposited on its inner surface two strip electrodes 17, 19. The slide 7 and the electrodes 13, 15 have a region which overlaps an edge of the layer 11 and the slide 9, whilst the slide 9 and the electrodes 17, 19 have a region which overlaps an edge of the layer 11 and the slide 7. These overlapping regions are provided to allow external electrical connections (not shown) to be made to the respective electrodes 13, 15, 17 and 19.

The optical activity of the layer 11 is high when no voltage is applied across the layer 11; in other words the layer 11 rotates the plane of polarisation of light incident on it by 90° when no voltage is applied across it. However, the optical activity of a region of the layer 11 is low when an appropriate voltage, normally between 1 and 3 volts, is applied across that region; in other words that region does not rotate the plane of polarisation of light. The polariser 3 is set to pass a linear polarisation in the same direction as the direction used to rub the inner surface of the slide 7 or the projection of the direction used for oblique molecular depostion on that surface, as appropriate. The analyser 5 is set to pass a linear polarisation perpendicular to that passed by the polariser 3. Therefore, when light having a fixed intensity is incident in the direction X on the polariser 3 the corresponding intensity of the light emergent from a given region of the analyser 5 is high if the region of the layer 11 corresponding to the given region has no voltage applied across it and is low if the region of the layer 11 corresponding to the given region has an appropriate voltage applied across it.

Four discrete regions of the layer 11 are defined where the electrodes 13 and 15 cross over the electrodes 17 and 19. Therefore the intensity of light emergent from four regions of the analyser 3 which correspond to these four regions can be separately selected by either applying or not applying an appropriate voltage between the electrode 13 and/or the electrode 15 and the electrode 17 and/or the electrode 19 as appropriate. The voltage(s) may be in the form of a positive pulse of electrical potential applied repetitively to one electrode and a negative pulse of electrical potential applied repetitively to the other electrode contemporaneously with the positive pulses. Alternatively, the voltage(s) may be alternating.

In practice, a large area device, for instance, an alphanumeric display device is built by providing a large number of regions, similar to the four regions of the layer 11, arranged in groups in the form of alphanumeric characters, e.g., numerals, letters or symbols.

In a modification of the device shown in FIGS. 3 and 4 separate conductors may be provided to each of the individual electrodes to energize them independently of the others so as to provide a display, the electrodes being shaped to form the display characters or parts thereof, in a known way. In an even simpler modification only one electrode need be deposited on each device substrate. Such a simple device may be used as an optical shutter or as a simple display if the electrodes are appropriately shaped.

In the device according to the invention described in application Ser. No. 552,346, the problem of reverse twist is avoided by using the said optically active liquid crystal material, whereby the liquid crystal molecules have an intrinsinc tendency to arrange themselves in a twist in one sense only, and the problem of reverse tip is avoided by treating the inner surfaces of the substrates in such a way that the liquid crystal molecules immediately adjacent to the said one inner surface lie generally at an angle to that surface and the liquid crystal molecules immediately adjacent to the said other inner surface lie generally in the plane of that surface, whereby the molecules in the interior of the layer are re-oriented all in the same way in an electric field.

Figure 5:
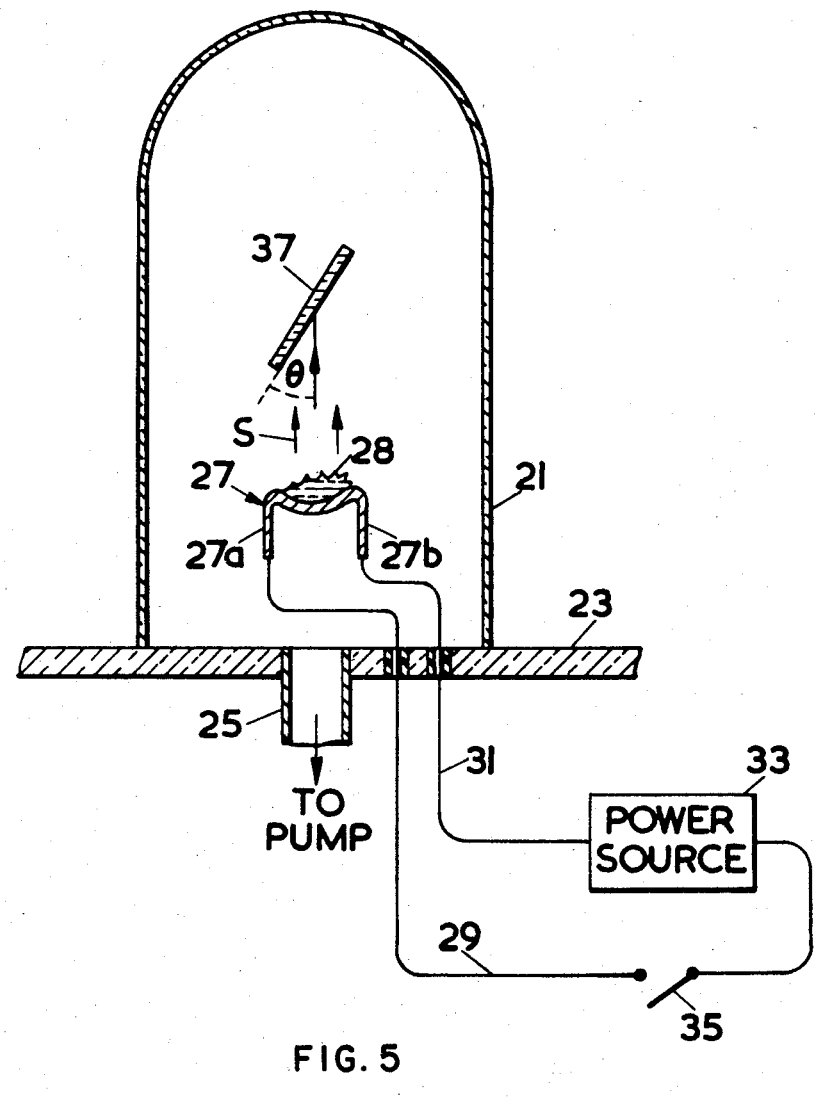

Embodiments of the present invention described in application Ser. No. 552,346 will now be described by way of example with reference to the accompanying drawings, in which:

FIG. 5 is a diagram, partly in cross-sectional side elevational form and partly in schematic circuit form, of apparatus used for producing a device embodying the invention.

FIGS. 6a to 6d are diagrammatic cross-sectional illustrations of the arrangement of molecules in various liquid crystal cells.

Figure 7:
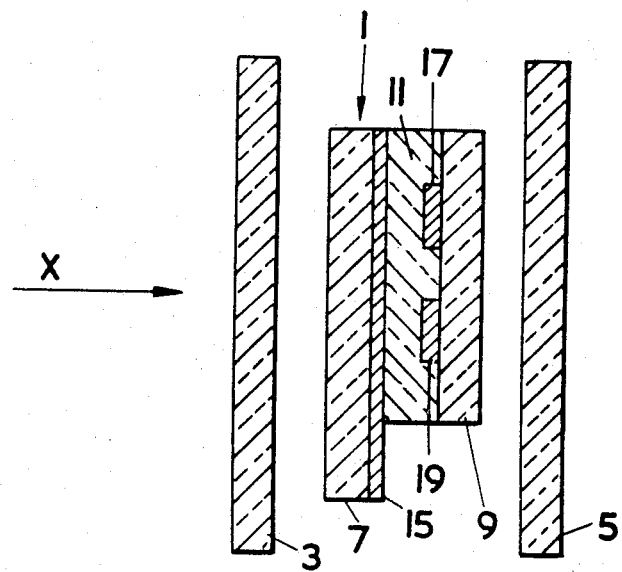

FIG. 7 is a cross-sectional side elevation of a liquid crystal device made by a method embodying the present invention.

Figure 8:
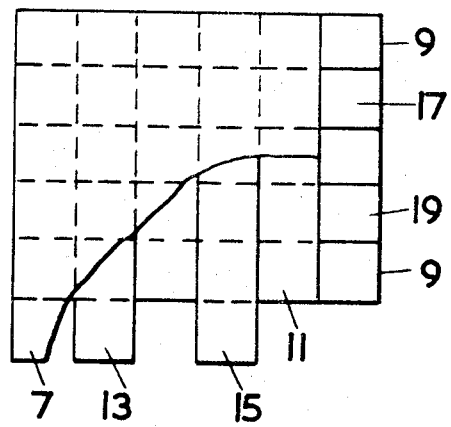

FIG. 8 is a partly cut-away front elevation of part of the device illustrated in FIG. 7.

A liquid crystal cell of the kind described hereinbefore and which embodies the present invention may be made by the following method. The surfaces of two glass slides (thin glass plates) which are to act as optically transparent substrates are carefully cleaned. A thin film of transparent conducting material such as tin oxide is formed by a known technique on a surface or on selected parts of a surface of each slide to form the device electrodes; if the formation of the film is in selected parts of each surface it may, for instance, be carried out by depositing a single layer and selectively photo-etching the layer. The slides are then coated by the technique of oblique evaporation in the way now to be described with reference to FIG. 5.

In the apparatus illustrated in FIG. 5, a bell-jar 21 rests on an insulating base plate 23 having an outlet pipe 25 leading to a vacuum pump (not shown) which enables the bell-jar 21 to be evacuated. A crucible 27 made of tungsten or molybdenum is located inside the bell-jar 21 near the base thereof. The crucible 27 holds a few grams of magnesium fluoride crystals 28. The crucible 27 has two downward-pointing arms 27a and 27b respectively connected to electrical leads 29 and 31. A conventional power source 33 and an electrical switch 35 are connected in series and between the leads 29 and 31 outside the bell-jar 21. A glass slide 37 is positioned inside the bell-jar 21 directly above the crucible 27 and at an angle θ to the vertical axis of the bell-jar 21 where θ is in the range 15°≦ θ ≦45°.

The bell-jar 21 is initially pumped to a vacuum of about $10^{-5}$ mm Hg with the switch 35 open. The switch 35 is then closed and the power from the source 33 is adjusted until the crucible 27 glows at the appropriate temperature to evaporate the magnesium fluoride crystals 28. The current required to achieve this will typically be about 100 amps to give a temperature in the appropriate range (700°–1000° C). The magnesium fluoride crystals are then evaporated to form an upward molecular stream indicated in the drawing by the symbol S, and the stream S is incident on the glass slide 37 at an angle θ to the slide 37 and consequently coats the glass slide 37. The angle θ is the "angle of incidence" referred to above, and the direction of the stream S is the "oblique evaporation direction" referred to above. The thickness of the coating is normally between 100 and 1000 Angstroms. This may be determined from a thickness v time calibration of the apparatus carried out prior to the insertion of the glass slide 17 into the bell-jar 21. When an appropriately thick coating has been formed the power from the source 13 is reduced, the switch 15 is opened and the bell-jar 21 and its contents are allowed to cool; the pressure is then raised to atmospheric and the glass slide 17 is removed from the bell-jar.

It is not essential for the material used to form the molecular coating to be magnesium fluoride, although it is preferable to use this material Silicon monoxide or other suitable optically transparent material may alternatively be used; such material must be electrically insulating material so that it does not electrically affect the transparent conducting film.

Two glass slides from which a cell of the kind described above is to be made are thus coated in the same way as the glass slide 37 described with reference to FIG. 5. The two slides may be coated separately or together. In either case both slides are arranged at the same angle θ to the stream S with their respective surfaces containing the transparent conducting film facing the stream S.

After the slides have been coated by oblique evaporation one of them is rubbed about 5 times with a soft fabric such as cotton wool on the coating in single directional sense as in the conventional rubbing technique described above. The rubbing direction is arranged to be perpendicular to the projection on the appropriate slide of the oblique evaporation direction, i.e. the direction of the stream S from which it has been coated. This is because the liquid crystal molecules will subsequently lie with their projection on that slide generally along the perpendicular to the projection on that slide of the oblique evaporation direction. This is a consequence of using an angle of incidence for oblique evaporation in the range from about 15° to about 45°.

After one of the slides has been rubbed the two slides are brought parallel and close to one another so that their respective coatings face one another and are separated by about 15 μm (15 × $10^{-6}$ m), a typical liquid crystal layer thickness. The mutual arrangement of the coatings on the two slides is also such that the respective projections of the oblique evaporation directions on the slides are mutually perpendicular.

The gap between the two slides is then filled with an appropriate optically active liquid crystal material (discussed below) to avoid the problem of "reverse twist" mentioned above. For example the slides may be kept apart by a spacer, and the liquid crystal material may be drawn into the gap by capillary action, to form a liquid crystal layer. The liquid crystal molecules arrange themselves in the following way. Those immediately adjacent to the unrubbed slide lie generally along a direction which is in the plane of that slide and perpendicular to the projection on the slide of the oblique evaporation direction. Those liquid crystal molecules immediately adjacent to the rubbed slide lie with their axes along a direction which is at a small angle, ie about 2°, to the rubbed slide; the projection of this direction is perpendicular to the projection on the slide of the oblique evaporation direction. The liquid crystal molecules in the interior of the layer point in directions varying between those of the molecules immediately adjacent to the two slides.

The problems of "reverse tip" which occurs with twisted nematic cells produced in one of the known ways described above can be explained by first considering a simple nematic liquid crystal cell with no twist, ie. one in which the projections of the liquid crystal molecules on the glass slides are all in the same general direction, and then considering a 90° rotation of one of the slides about the common axis of the slides.

Figure 6A:
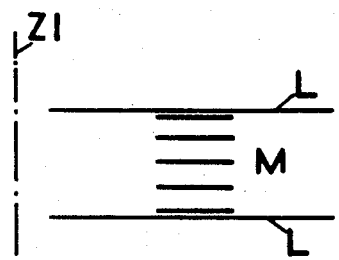

Firstly, consider the case where the simple nematic liquid crystal cell is made by treating the surfaces of its glass slides by oblique evaporationalone using an angle of incidence in the range from 15° to 45°. FIG. 6a illustrates the molecular arrangement in such a cell. The liquid crystal molecules, indicated by a symbol M, generally lie in the plane of the slides, indicated by a symbol L, and all point in the same general direction. If one of the slides L is now rotated through an angle of 90° about an axis Z1 perpendicular to the slides L the molecules immediately adjacent to one slide L will be generally perpendicular to those immediately adjacent to the other slide L and those in the interior of the liquid crystal layer will generally be at progressively varying angles between 0° and 90° to those immediately adjacent to one of the slides L.

However all of the molecules M remain generally in the plane of the slides L. The 90° rotated version of the arrangement illustrated in FIG. 6a is structurally the same as the arrangement in a twisted nematic cell produced by initially arranging the slides L, before introducing the liquid crystal material between them, so that the respective projections on the slides of the oblique evaporation directions are mutually perpendicular. Thus the liquid crystal molecules in such a twisted nematic cell are generally in the plane of the slides as in the arrangement obtained by rotating that illustrated in FIG. 6a by 90°; and, as noted above, this leads to the problem of "reverse tip" when an electric field is applied.

Figure 6B:
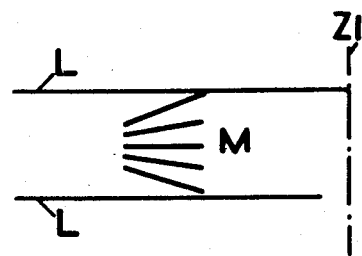
Figure 6C:
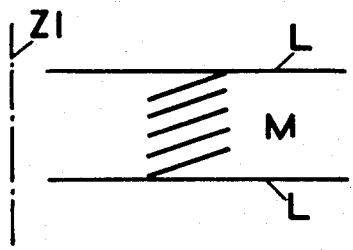

Next, consider the case where the simple nematic cell is made by treating the slides L by the technique of rubbing or by the technique of oblique evaporation with an angle of incidence less than 15°, which techniques, for the purpose of this explanation, give the same result. The aligning directions, i.e. the rubbing directions or the projections of the oblique evaporation directions, on the slides L of the cell are arranged initially to be parallel. The liquid crystal molecules immediately adjacent to the respective slides L of the cell are aligned generally oblique to the inner surface of those slides. Consequently the liquid crystal molecules M will be in one of the two possible arrangements according to whether the two aligning directions are both in the same sense or are in opposite senses. FIG. 6b illustrates one of these arrangements and FIG. 6c illustrates the other. In the arrangement illustrated in FIG. 6b the molecules M form a "splayed" regime and all point towards the interior of the liquid crystal layer. The molecules M in the interior are in the plane of the slides L. In the arrangement illustrated in FIG. 2c the molecules M form a "tilted regime" and are all tilted in one sense with respect to the slides L. Consider now that one of the slides L is kept in the same plane but is rotated through 90° about the axis Z1; this means that the liquid crystal molecules immediately adjacent to the rotated slide L rotate with that slide L.

After rotation of one of the slides L in the arrangement illustrated in FIG. 6b the molecules M in the interior of the layer will still be in the plane of the slides L, and after rotation of one of the slides S in the arrangement illustrated in FIG. 6c the molecules M throughout the entire layer will still be tilted with respect to the slides L.

The 90° rotated versions of the arrangements illustrated in FIGS. 6b and 6c are respectively equivalent to two different forms of twisted nematic cell. In other words, in twisted nematic cells produced using either the known techniques of rubbing or oblique evaporation with an angle of incidence less than 15° applied to both slides the liquid crystal molecules are either arranged in a "splayed" from which is the same as the arrangement obtained by a 90° rotation of one of the slides L illustrated in FIG. 6b or are arranged alternatively in a "tilted" form which is the same as the arrangement obtained by a 90° rotation of one of the slides L illustrated in FIG. 6c.

As explained above, if the molecules in the interior of the liquid crystal layer lie in the plane of the slides the problem of "reverse tip" described above arises. Therefore the "splayed" form of cell gives rise to the problems of reverse tip, whereas the "tilted" form of cell does not. The "tilted" form of cell is obtained by using an optically active liquid crystal material and by ensuring that the screw sense defined by the aligning directions on the two slides L is in opposition to the helical sense of the natural arrangement of the liquid crystal molecules, as described in my copending application Ser. No. 551,551 filed Feb. 21, 1975.

Figure 6D:
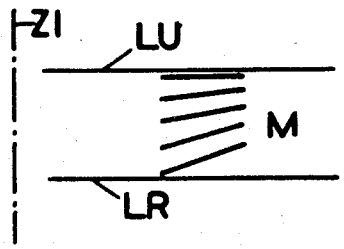

Consider now a simple nematic cell made in a way similar to that used for making the cell of the kind described above which embodies the invention, i.e., produced as described with reference to FIG. 5, but for which simple cell the respective aligning directions are parallel; in other words, the rubbing direction on the rubbed slide and the perpendicular to the projection of the oblique evaporation direction on the unrubbed slide are parallel. The arrangement of the molecules M is this simple nematic cell is illustrated in FIG. 6d. Except in the plane immediately adjacent to the unrubbed slide, denoted by the symbol LU, the molecules M throughout the liquid crystal layer are tilted with resect to the plane of the slides to a degree which increases towards the rubbed slide, denoted by the symbol LR.

Consider now that one of the slides is rotated through an angle of 90° about the axis Z1. The molecules M throughout the layer except those immediately adjacent to the unrubbed slide LU remain tilted with respect to the plane of the slides. The arrangement obtained by a 90° rotation of that illustrated in FIG. 6d is structurally the same as the arrangement in the cell embodying the invention produced in the way described with reference to FIG. 5. Thus, in the cell described above embodying the invention the small angle, i.e., about 2°, between the liquid crystal molecules immediately adjacent to the rubbed slide and the slide itself is sufficient to provide a tilting out of the plane of the slides of the molecules throughout the layer except immediately adjacent to the unrubbed slide; furthermore this tilting is sufficient for the problems of "reverse tip" to be avoided, ie for all of the interior liquid crystal molecules to be re-oriented in the same way, i.e. sense, when an electric field is applied between the transparent conducting films on the respective slides. The liquid crystal molecules immediately adjacent to the unrubbed slide are not affected to any great extent by the electric field in any event so that they do not contribute to the problem of "reverse tip".

Although in a practical liquid crystal cell the directions of the liquid crystal molecules in the liquid crystal layer have a spatial fluctuation, the descriptions given above with reference to FIGS. 6a to 6d are valid if the molecules M in those FIGS. are considered to be molecules having axes along the average molecular direction for each localised region of the layer. The spatial fluctuation of the direction of the molecules immediately adjacent to the slides is in any event much smaller than that of the molecules in the interior of the layer.

In another embodiment of the invention a cell of the kind described may be produced by treating the surface of one slide by oblique evaporation with an angle of incidence in the range from 15° to 45° and by treating the other slide by rubbing without oblique evaporation. The slides are arranged by making the rubbing direction on the rubbed slide parallel to the projection of the oblique evaporation direction on the other slide, because the liquid crystal molecules immediately adjacent to the rubbed slide will follow the rubbing direction.

It is less convenient to produce the cell in this way (compared with the way described with reference to FIG. 5) since rubbing of the transparent conducting film directly generally gives irreproducible results.

In another embodiment of the invention a cell of the kind described may be produced by treating the surface of the first slide by oblique evaporation with an angle of incidence between 15° to 45° and by treating the second slide by oblique evaporation with an angle of incidence less than 15°.

As noted above, the liquid crystal molecules immediately adjacent to the first slide will lie generally in a direction perpendicular to the projection of the oblique evaporation direction on that slide; however the liquid crystal molecules immediately adjacent to the second slide will lie generally in a direction whose projection is parallel to the projection of the oblique evaporation direction on that slide. Therefore the first and second slides are arranged in this case by making the respective projections of the oblique evaporation directions on the slides parallel to one another to give the appropriate liquid crystal molecular twist. It is less convenient to produce a cell in this way (as compared with the way described with reference to FIG. 5) because in this case the liquid crystal molecules are generally tilted at a greater angle and this can lead to degradation of the optical performance of the cell.

As noted above, the spacing between the two glass slides in a liquid crystal cell is typically about 15 μm. In cells of the kind described roughly a 90° helical twist in the molecular arrangement of the molecules of the liquid crystal material is arranged in the spacing between the slides. The molecules of the liquid crystal material used need to have a natural helical pitch (a 360° turn of the helix) of at least twice the spacing between the slides, ie 30 μm or more, but preferably about 80 μm, so that the molecules will rearrange themselves to form the π/2(90°) twist when located between the slides. If the pitch is less than twice the spacing the molecules will rearrange themselves to form a twist through an angle mπ/2, where m is an odd integer greater than 1, and so such small pitches are unsuitable.

Suitable liquid crystal material having a natural helical molecular pitch of the correct size may for example be made by diluting a nematic liquid crystal material with an optically active additive which may or may not be a cholesteric liquid crystal material. The nematic material preferably has a positive dielectric anisotropy (ie difference between the dielectric constant measured parallel to themolecules and the dielectric constant measured perpendicular to the molecules). A suitable nematic material is the biphenyl

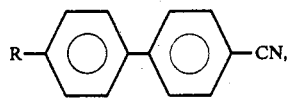

where R is an alkyl or alkoxy group, for example n—$C_5H_{11}$ or n—$C_5H_{11}O$. The additive will not normally have to form more than 2% by weight of the solution with the nematic material.

A suitable cholesteric material for diluting nematic material to give an appropriate mixture is, for example, cholesteryl nonanoate (0.2% weight in the mixture with the nematic material). The mixture may be formed by adding appropriate volumes of nematic and cholesteric materials in a small beaker, heating the beaker above the temperature at which the isotropic liquid phase occurs (ie when a clear liquid is produced) and stirring and then allowing the beaker and its contents to cool again.

If the mixture is formed from a nematic liquid crystal material and a non-cholesteric optically active material it may similarly be produced by adding suitable volumes of the nematic material and the non-cholesteric material also in a small beaker, heating the beaker above the temperature at which the isotropic phase of the nematic material occurs and allowing the beaker and its contents to cool again. The optically active material may for example be Canada balsam, or the compound

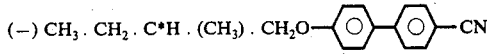

(1% by weight in the mixture with the nematic material). The asterisk * denotes the optically active centre of the material.

FIG. 7 is a cross-sectional side elevation of a simple liquid crystal device which includes a cell 1 located between an optical polariser 3 and an optical polarisation analyser 5. FIG. 8 is a partly cut-away front elevation of the cell 1 alone viewed in the direction X. The cell 1 is a cell of the kind described, which embodies the invention and which is produced in one of the ways described above. The cell 1 includes a glass slide 7 and a glass slide 9 between which is located a layer 11 of suitable liquid crystal material (as described above). The slide 7 has deposited on its inner surface two strip electrodes 13, 15, and the slide 9 has deposited on its inner surface two strip electrodes 17, 19. The strip electrodes 13, 15, and 17, 19 respectively constitute the transparent conducting films mentioned above. The slide 7 and the electrodes 13, 15 have a region which overlaps an edge of the layer 11 and the slide 9, whilst the slide 9 and the electrodes 17, 19 have a region which overlaps an edge of the layer 11 and the slide 7. These overlapping regions are provided to allow external electrical connections (not shown) to be made to the respective electrodes 13, 15, 17 and 19.

The optical activity of the layer 11 is high when no voltage is applied across the layer 11; in other words the layer 11 rotates the plane of polarisation of light incident on it by 90° when no voltage is applied across it. However the optical activity of a region of the layer 11 is low when an appropriate voltage, normally between 1 and 3 volts, is applied across that region; in other words that region does not rotate the plane of polarisation of light. The polariser 3 is set to pass a linear polarisation in the same direction as the projection on the slide 7 of the general direction of the liquid crystal molecules immediately adjacent to the slide 7 (which, as discussed above, depends on the particular way in which the cell 1 is arranged; although if, for instance, the slide 7 has been rubbed the linear polarisation direction of the polariser 3 is parallel to the rubbing direction). The analyser 5 is set to pass a linear polarisation perpendicular to that passed by the polariser 3. Therefore, when light having a fixed intensity is incident in the direction X on the polariser 3 the corresponding intensity of the light emergent from a given region of the analyser 5 is high if the region of the layer 11 corresponding to the given region has no voltage applied across it and is low if the region of the layer 11 corresponding to the given region has an appropriate voltage applied across it.

Four discrete regions of the layer 11 are defined where the electrodes 13 and 15 cross over the electrodes 17 and 19. Therefore the intensity of light emergent from four regions of the analyser 3 which correspond to these four regions can be separately selected by either applying or not applying an appropriate voltage between the electrode 13 and/or the electrode 15 and the electrode 17 and/or the electrode 19 as appropriate. The voltage(s) may be in the form of a positive pulse of electrical potential applied repetitively to one electrode and a negative pulse of electrical potential applied repetitively to the other electrode contemporaneously with the positive pulses. Alternatively the voltage(s) may be alternating. In practice, a large area device, for instance, an alphanumeric display device is built by providing a large number of regions, similar to the four regions of the layer 11, arranged in groups in the form of alphanumeric characters, e.g numerals, letters or symbols.

In a modification of the device shown in FIGS. 7 and 8 separate conductors may be provided to each of the individual electrodes to energise them independently of the others so as to provide a display, the electrodes being shaped to form the display characters or parts thereof, in a known way. In an even simpler modification only one electrode need be deposited on each device substrate. Such a simple device may be used as an optical shutter or as a simple display if the electrodes are appropriately shaped.

What is claimed is:

1. A liquid crystal cell comprising two facing substrates having deposited on their respective inner surfaces an electrode layer, at least one of said substrates and its electrode layer being optically transparent, and between said inner surfaces a layer of liquid crystal material in which liquid crystal molecules are arranged in the absence of an applied electric field to lie along a varying average direction throughout said layer, said average direction twisting progressively from one of said inner surfaces to the other of said inner surfaces wherein the improvement comprises the following features to avoid patchy appearance when said cell is viewed between optical polarizers:
  (a) said material is an optically active material having a natural molecular helical pitch at least approximately twice the average thickness of said layer;
  (b) the liquid crystal molecules of said material adjacent to a first of said inner surfaces are aligned by that inner surface and are tilted at an angle to that surface; and
  (c) the liquid crystal molecules adjacent to the second of said inner surfaces are tilted at an angle to that inner surface and the alignment vectors on the respective substrate inner surfaces, an alignment vector being given by the projection on a surface of the direction along which the tilted molecules adjacent to that surface point, together define a screw sense which opposes the natural helical twist of said liquid crystal material;
  (d) the combination of said material and said alignments together providing in the interior of said layer of liquid crystal material an average molecular orientation which is oblique to said substrate inner surfaces.

2. A cell as in claim 1 and wherein the liquid crystal molecules adjacent both of said inner surfaces have alignments roughly at an angle of 2° to those respective inner surfaces produced by rubbing those inner surfaces each in a single direction, the alignment vector for each surface being its rubbing direction.

3. A cell as in claim 1 and wherein the liquid crystal molecules adjacent both of said inner surfaces have alignments roughly at an angle of 30° to those respective inner surfaces produced by a coating on each surface deposited by oblique evaporation along a single direction with an angle of incidence less than approximately 10°, the alignment vector for each surface being the projection on the surface of the oblique evaporation direction.

4. A cell as in claim 1 and wherein the liquid crystal molecules adjacent said first and said inner surfaces have an alignment roughly at an angle of 2° to that surface produced by rubbing that surface in a single direction, the alignment vector for that surface being the rubbing direction, and the liquid crystal molecules adjacent said second of said inner surfaces have an alignment roughly at an angle of 30° to that surface produced by a coating on that surface deposited by oblique evaporation along a single direction with an angle of incidence less than approximately 10°, the alignment vector for that surface being the projection on the surface of the oblique evaporation direction.

5. A liquid crystal device comprising a liquid crystal cell sandwich disposed between an optical polarizer and an optical polarization analyzer, said cell comprising first and second facing spaced glass plates with the first plate adjacent to and facing the polarizer and the other adjacent to and facing the analyzer, an electrode on the facing inner surface of each plate, at least one of the electrodes being transparent, an optically active liquid crystal material filling the space between the plates which has a natural molecular helical pitch which is at least about twice the space distance between the plates, each of said plates having an inner surface which is adapted in the absence of electric current to tilt the molecules of the liquid crystal material adjacent to that surface from an average position which is exactly parallel to the plane of the cell sandwich and to oppose the twist sense of the optically active material.

6. An optical display device comprising parallel walls defining a cell, a nematic liquid crystal material disposed between the cell walls, said liquid crystal material including at least some cholesteric type liquid crystal which confers to a uniform direction of twist upon the liquid crystal material between the cell wells, said cell walls having flat internal surfaces in contact with the liquid crystal material, and each said surface having a surface treatment such that substantially all the liquid crystal molecules in contact with the surface lie at the same angle to said surface, said angle being different for the two surfaces, and means for selectively applying an electrical potential difference between said internal surfaces of the cell walls such as to establish an electric field in the liquid crystal material such as substantially to align the liquid crystal molecules with said electric field.

7. The device defined in claim 6, wherein the angle which the molecules of the liquid crystal make with one of the cell wall surfaces is less than 30° and the angle which said molecules make with the other cell wall surface is substantially 0°.

8. The device defined in claim 6, wherein the internal surface of at least one of the cell walls is treated by evaporation of a coating onto each surface in a direction inclined at a predetermined angle to said surface.

9. The device defined in claim 8, wherein the said predetermined angle of evaporation is inclined at substantially 5° to one cell wall surface and substantially 30° to the other cell wall surface.

10. The device defined in claim 8, wherein the evaporated material is silicon monoxide.

11. The device defined in claim 6, wherein the liquid crystal cell filling includes at least 0.25% of cholesteryl nonanoate.

12. A liquid crystal cell comprising two facing substrates having deposited on their respective inner surfaces an electrode layer, at least one of said substrates and its electrode layer being optically transparent, and between said inner surfaces a layer of liquid crystal material in which liquid crystal molecules are arranged in the absence of an applied electric field to lie along a varying average direction throughout said layer, said average direction twisting progressively from one of said inner surfaces to the other of said inner surfaces wherein the improvement comprises the following features to avoid patchy appearance when said cell is viewed between optical polarizers:
  (a) said material is an optically active material having a natural molecular helical pitch at least approximately twice the average thickness of said layer;
  (b) the liquid crystal molecules of said material adjacent to a first of said inner surfaces are aligned by that inner surface and are tilted at an angle to that surface; and (c) the liquid crystal molecules adjacent to the second of said inner surfaces are aligned by that second inner surface and are substantially parallel to that surface;

(d) the combination of said material and said alignments together provide in the interior of said layer of liquid crystal material an average molecular orientation which is oblique to said substrate inner surfaces.

13. A cell as in claim 12 wherein said second inner surface has a coating deposited thereon by oblique evaporation in a single direction with an angle of incidence in the approximate inclusive range of from 10° to 45° to provide said alignement of said liquid crystal molecules at that surface.

14. A cell as in claim 12 wherein said first inner surface has a coating deposited thereon to provide said alignment of the liquid crystal molecules adjacent to that surface.

15. A cell as in claim 13 and wherein said coating on said first inner surface has been unidirectionally rubbed to provide tilt of said liquid molecules adjacent to the first inner surface.

16. A cell as in claim 13 and wherein said coating on said first inner surface provides tilt of said liquid crystal molecules adjacent to the first inner surface.

17. A liquid crystal device comprising a liquid crystal cell sandwich disposed between an optical polarizer and an optical polarization analyzer, said cell comprising first and second facing spaced glass plates with the first plate adjacent to and facing the polarizer and the other adjacent to and facing the analyzer, an electrode on the facing inner surface of each plate, at least one of the electrodes being transparent, an optically active liquid crystal material filling the space between the plates which has a natural helical pitch which is at least about twice the space distance between the plates, one of said plates having an inner surface which is adapted in the absence of electric current to tilt the molecules of the liquid crystal material adjacent to that surface from an average position which is exactly parallel to the plane of the cell sandwich, and the other plate having a surface whereby the molecules of the liquid crystal material are aligned substantially parallel thereto.

18. A liquid crystal cell comprising two facing substrates having deposited on their respective inner surfaces an electrode layer, at least one of said substrates and its electrode layer being optically transparent, and between said iner surfaces a layer of liquid crystal material in which liquid crystal molecules are arranged in an absence of an applied electric field to lie along a varying average direction throughout said layer, said average direction twisting progressively from one of said inner surfaces to the other of said inner surfaces wherein the improvement comprises said liquid crystal material being a naturally optically active material having a natural molecular helical pitch at least approximately twice the thickness of said layer of liquid crystal material and said inner surfaces having been treated and mutually arranged in such a way that said average direction of the molecules of said layer of liquid crystal material is oblique to at least one of said inner surfaces.

19. The liquid crystal cell of claim 18 wherein the said inner surfaces have been treated and mutually arranged whereby the average direction of the molecules of said layer of liquid crystal material is oblique to said innser surfaces throughout the entire layer in the absence of an applied electric field.

20. The liquid crystal cell of claim 18 wherein said inner surfaces having been previously treated and mutually arranged in such a way that said average direction of the molecules of said layer of liquid crystal material is oblique to said one inner surface but generally in the plane of said other inner surface.

* * * * *